Dec. 1, 1953   G. E. BOMBARGER   2,661,116
COLLAPSIBLE FISH BOX
Filed June 26, 1950   5 Sheets-Sheet 1
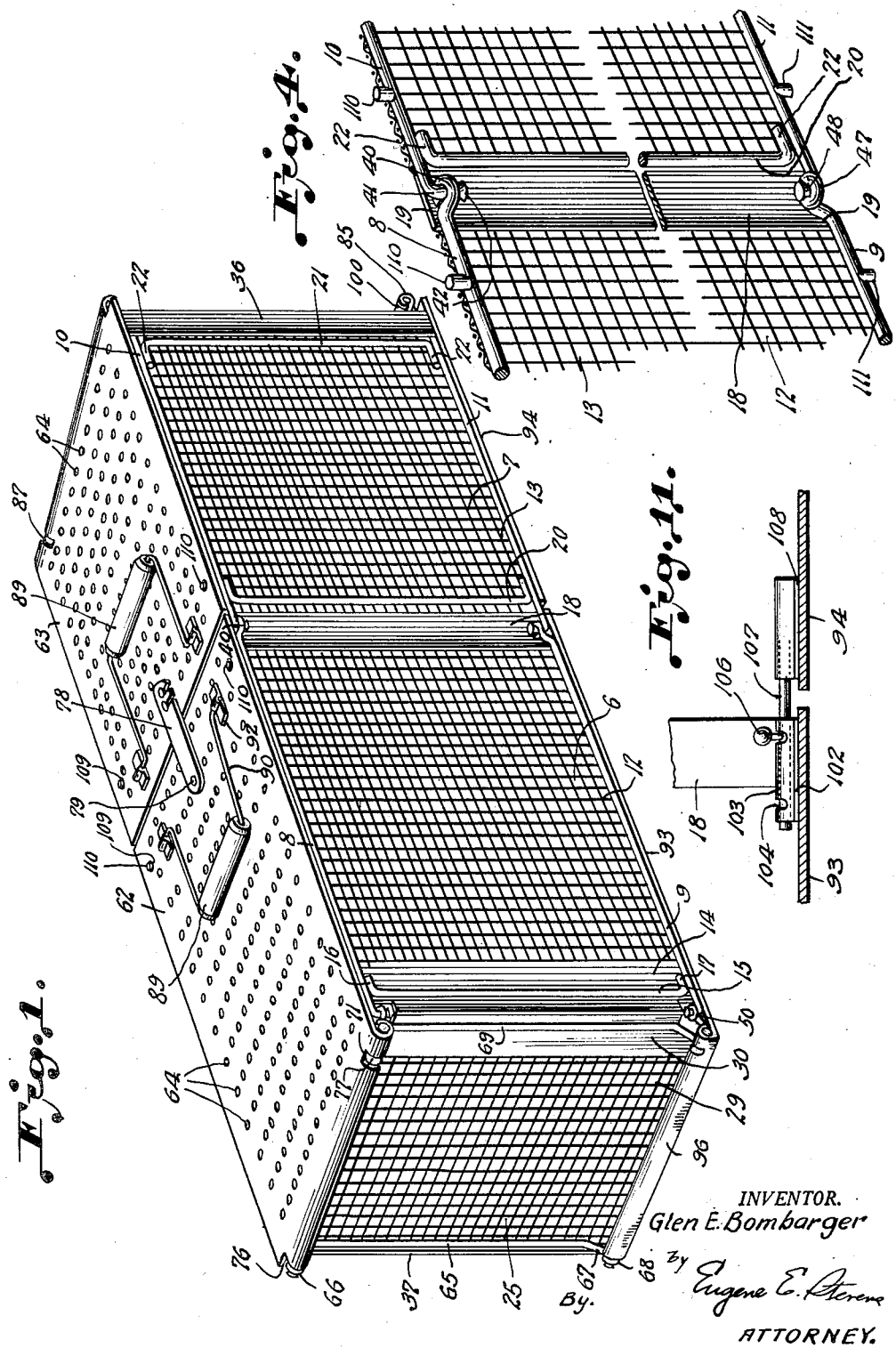
INVENTOR.
Glen E. Bombarger
By Eugene E. Stevens
ATTORNEY.

Dec. 1, 1953 G. E. BOMBARGER 2,661,116
COLLAPSIBLE FISH BOX
Filed June 26, 1950 5 Sheets-Sheet 2
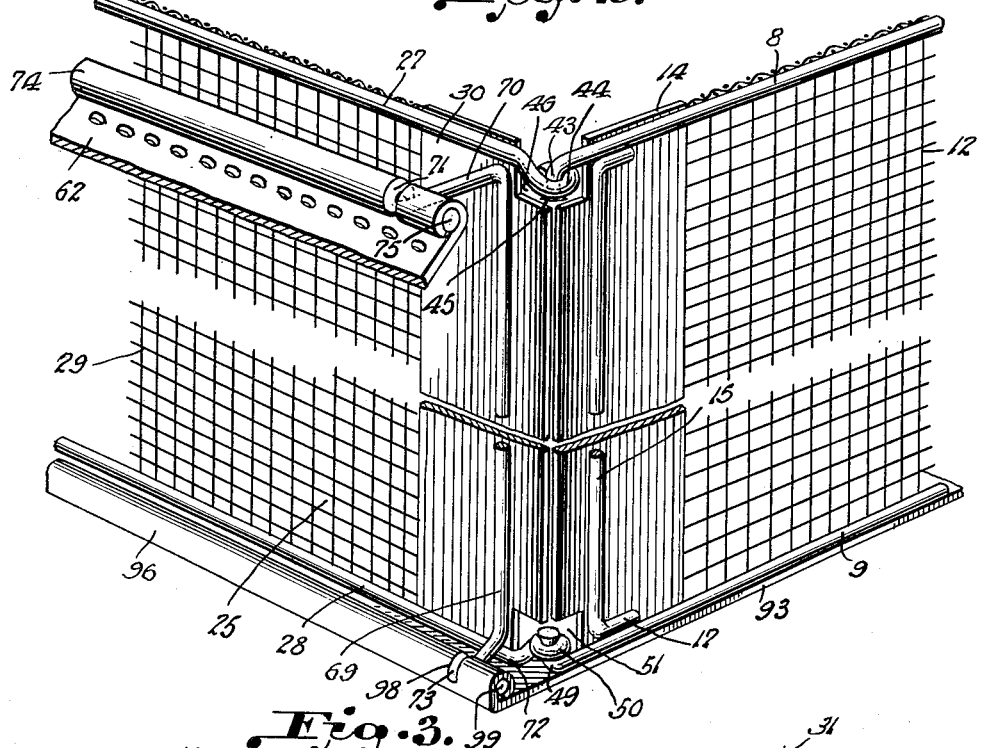
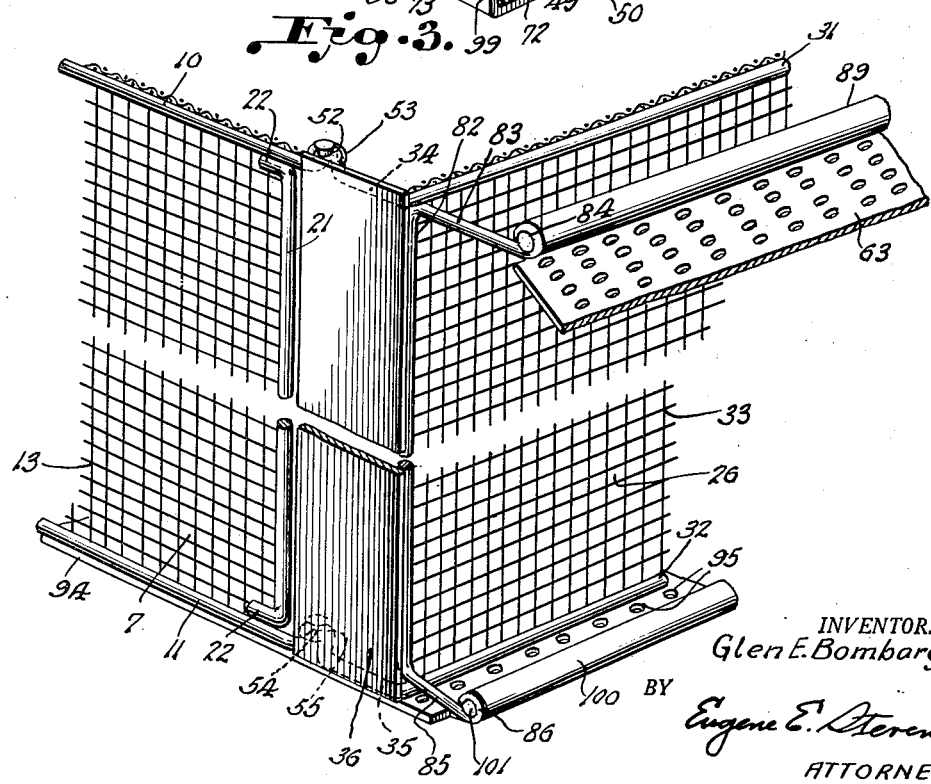
INVENTOR.
Glen E. Bombarger
BY
Eugene E. Stevens
ATTORNEY.

Dec. 1, 1953    G. E. BOMBARGER    2,661,116
COLLAPSIBLE FISH BOX
Filed June 26, 1950    5 Sheets-Sheet 3

INVENTOR.
Glen E. Bombarger
BY
Eugene E. Stevens
ATTORNEY.

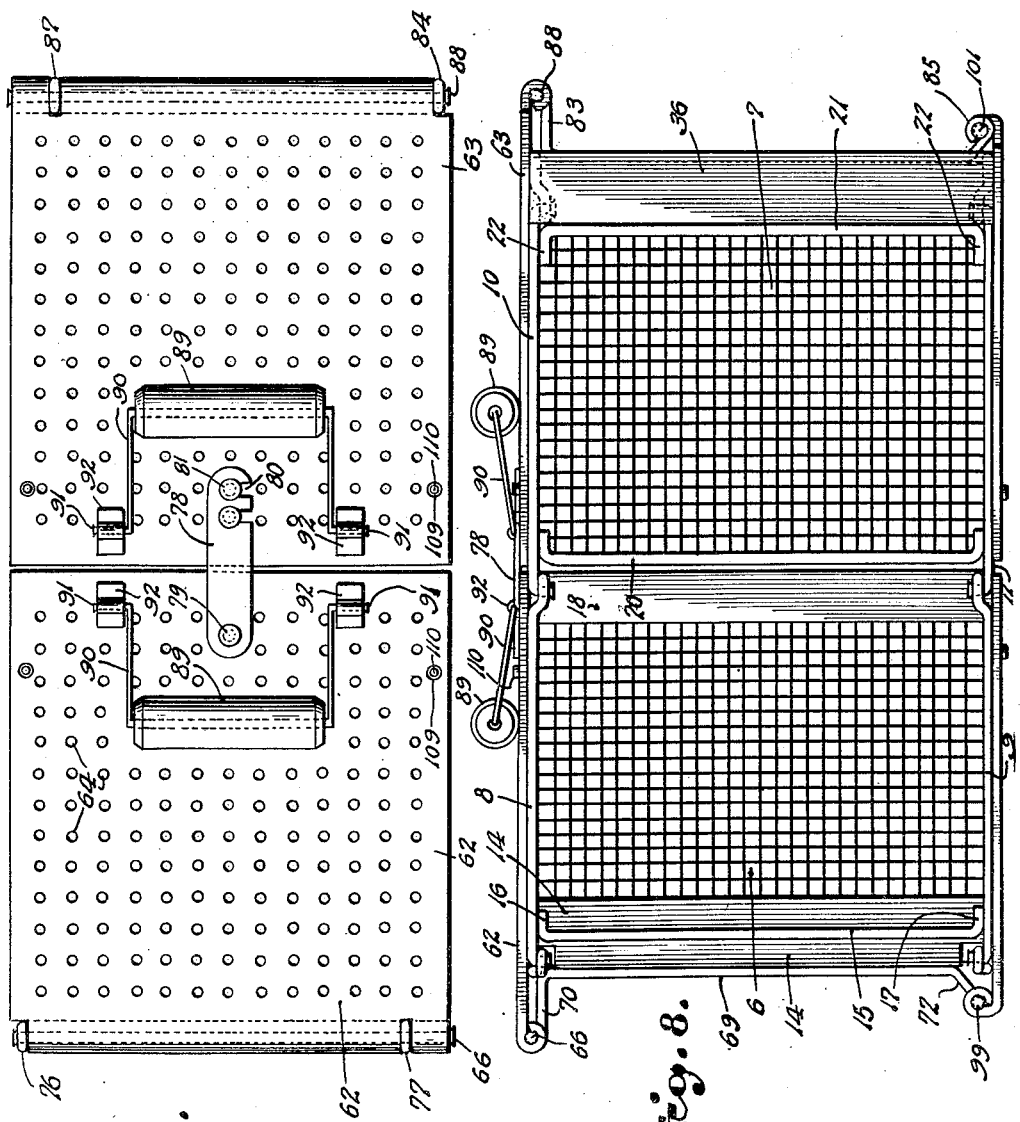

Dec. 1, 1953  G. E. BOMBARGER  2,661,116
COLLAPSIBLE FISH BOX
Filed June 26, 1950  5 Sheets-Sheet 5
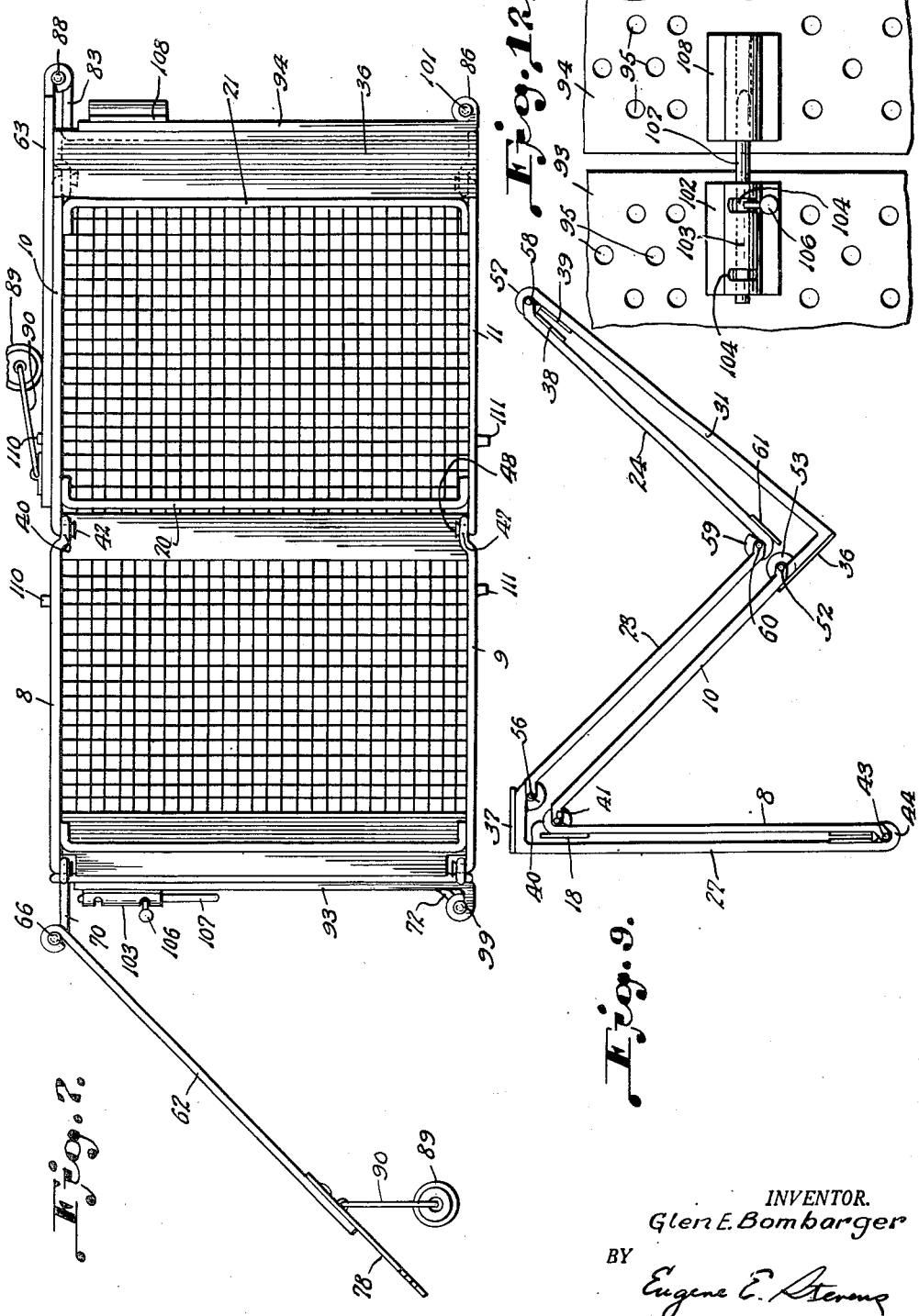
INVENTOR.
Glen E. Bombarger
BY
Eugene E. Stevens
ATTORNEY.

Patented Dec. 1, 1953

2,661,116

UNITED STATES PATENT OFFICE 2,661,116

COLLAPSIBLE FISH BOX

Glen E. Bombarger, Milwaukee, Wis.

Application June 26, 1950, Serial No. 170,300

7 Claims. (Cl. 220—6)

This invention relates to a collapsible or foldable box to be specifically used by fishermen or the like, said box providing for the safe storage of live fish, minnows, crabs or the like.

An important object of the invention is to provide a collapsible fish box which may be constructed entirely of metal in which all sections thereof are hingedly secured together, with no parts or sections removable, and using no bolts, nuts, rods, screws or removable panels; thereby eliminating any possibility of the loss of any parts of the box.

A further object of the invention is to provide the hinges of the box of such construction that there is little possibility of the same becoming fouled by sand, grit or other matter while the box is submerged in the water.

A further object of the invention is to so construct the box that upon folding, the same can be collapsed into a relatively small area, the two bottom halves being folded to lie against the opposite ends of the box, the bottom halves being confined within the two top halves, and the handles on the top halves serving as carrying means for the collapsed box.

A further object of the invention is to provide the pivot means for at least two diametrically opposite corners to be spaced away from the corners, that is, along the opposite sides of the box, and further having the opposite pivots of the respective side sections spaced out of line with each other, such pivoting means providing in the collapsing of the box means wherein one section of each side moves to position adjacent each one of the end sections, and the other of the two side sections moving in a position parallel to each other.

A still further object is to provide upstanding pins on the upper and lower wire members of each section which fit into recesses formed in the top and bottom to thereby add rigidity to the box in its set up position.

Other objects and advantages will become apparent when considered in connection with the accompanying drawings and detailed description in which—

Fig. 1 is a perspective view of the fish box in its set up or ready for use position;

Fig. 2 is a vertical fragmentary view of one of the corner constructions;

Fig. 3 is a vertical fragmentary view of another of the corner constructions;

Fig. 4 is a fragmentary view at the side of the box showing the pivotal connection between the two panels of one side section;

Fig. 6 is a top plan view showing the hinged cover sections in closed position;

Fig. 7 is a view in side elevation showing the left hand cover and two bottom sections moved to open position;

Fig. 8 is a view in side elevation showing the box in its set up condition;

Fig. 9 is a view showing only the sides and end members in partially folded position;

Fig. 11 is a fragmentary view in side elevation of the locking bolt for the two bottom sections; and Fig. 12 is a plan view of the sliding bolt for holding the bottom sections in closed position.

Figure 5:
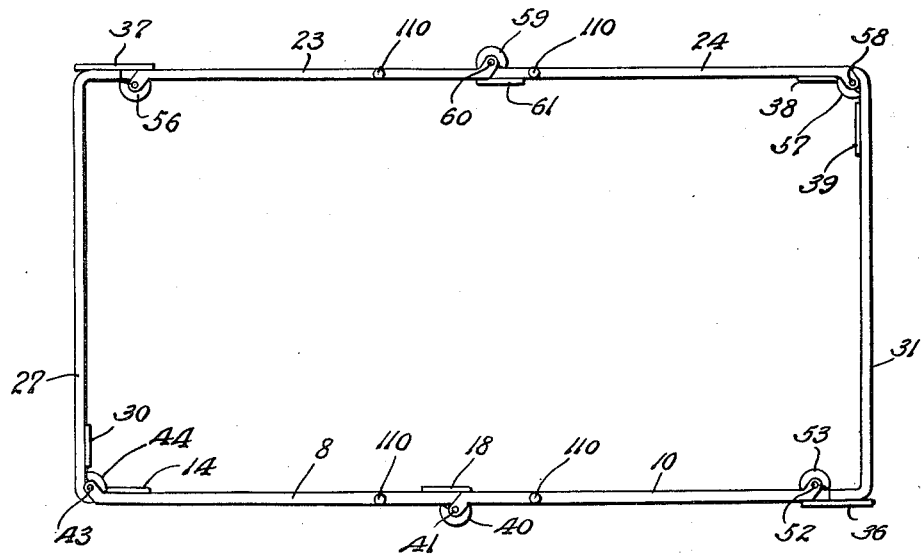
Fig. 5 is a top plan view showing the pivotal connections between the sides and respective corners of the box.
Figure 10:
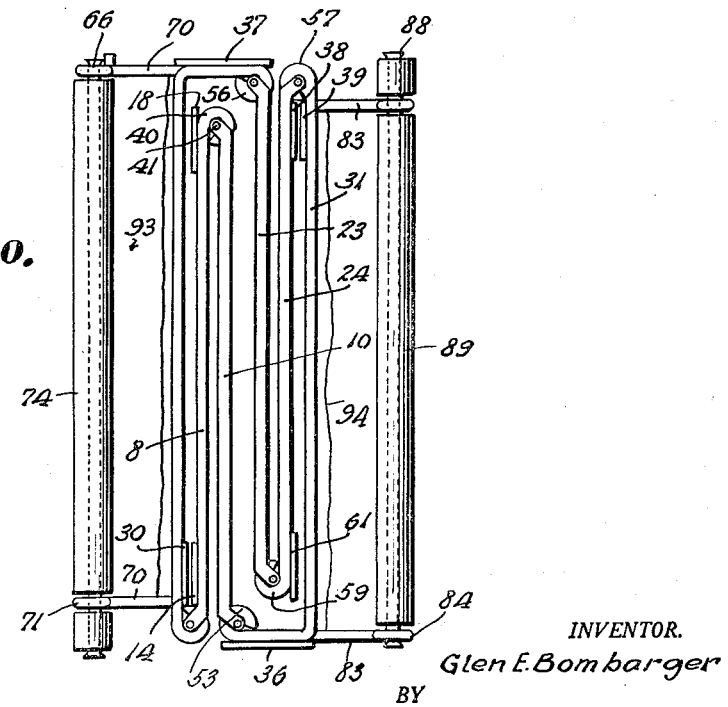
Fig. 10 is a view of the box in its folded or knockdown condition.

Referring specifically to the drawings, in which like numerals have been used to designate similar parts throughout the various views, the collapsible fish box is shown as being of generally rectangular shape, each side of the box consisting of two wire mesh pivoted sections, the respective side sections being identical, and, as seen in Fig.1, the right hand side sections of the box are indicated at 6 and 7. Each side section is provided along its top and bottom edges with relatively stiff frame wire rods, the section 6 having an upper rod 8 and a bottom rod 9, while the section 7 is provided with an upper framing wire rod 10 and a bottom framing wire rod 11. Each of the sections 6 and 7 are provided with a relatively small mesh stiff wire fabric 12 and 13, which may be welded or otherwise fixed along their opposite upper and lower edges to the rod frame members 8, 9, 10 and 11. The section 6 has at one of its ends a vertical sheet metal stiffening member 14 which is welded to the top and bottom frame members 8 and 9, said stiffening member forming one side of one of the box corners, and a vertical wire rod 15 having right angled inturned ends 16 and 17 which are welded to the inner sides of the rods 8 and 9 to give further stiffness and stability to the side section 6. A second sheet metal stiffener 18 is placed at about the mid-section of the box, the same being welded to the top and bottom frame rods 8 and 9 on their inner sides as at 19. The section 7 has at its opposite sides two vertical stiffening rods 20 and 21, each of which are identical and have right angled upper and lower ends 22 which are welded to the inner sides of the top and bottom frame wires 10 and 11 for strengthening the side section 7. The opposite side sections of the box are identical to the side sections just described and therefore a detailed description thereof is deemed unnecessary. However, as indicated in Figs. 5 and 9, the top wire frame rods of each section are indicated at 23 and 24.

The collapsible box is provided with opposite end sections 25 and 26 which are better illustrated in Figs. 2 and 3, said sections being made or constructed in a manner quite similar to the box side sections. Thus, the end section 25 is provided with upper and lower wire frame rods 27 and 28 to which is attached as by welding or the like a fine mesh wire fabric 29. One end of the end section is provided with a vertical metal stiffening plate 30 which may be welded along its upper and lower sides to the inner sides of the rods 27 and 28, the plate 30 forming a corner of the box and being positioned in close relation to the side edge of the stiffening plate 14. The opposite end section 26 of the box has upper and lower wire rod frame members 31 and 32, the end section being provided with a wire small-mesh fabric 33. It will be noted that the upper and lower rods 31 and 32 are bent inwardly at their ends at right angles to form one corner of the box, the inturned portions 34 and 35 having welded thereto a metal stiffening plate 36 closing one corner of the box. The diametrically opposite corner of the box is identical to the described corner, the vertical stiffening plate in this corner being shown at 37. This is also true of the corner diametrically opposite to the corner formed by the stiffener plates 14 and 30, the stiffener plates of said diametrically opposite corner being indicated at 38 and 39.

For providing and permitting the pivotal connection between the respective sides and end members of the box so that the same may be readily set up and collapsed, it will be seen that the top rod 8 of the side section 6 terminates at its inner end in an off-set eye 40 which lies opposite the vertical plate 18, said eye 40 receiving therein the downturned end portion 41 of the rod 10, said portion 41 thereafter being peened over as at 42 to prevent its removal from the eye. The outer end of the rod 8 is bent downwardly at 43 to engage in an off-set eye 44 formed at one end of the top end frame rod 27, the end of the part 43 being peened over at 45. It will be seen that the plates 14 and 30 are cut away to provide an opening 46 between the plates to accommodate the eye 43. Likewise, the lower rod 9 terminates at its inner end in an offset eye 47 which receives the upturned end 48 of the rod 11, and the opposite end terminates in an upturned part 49 to receive the offset eye part 50 of the bottom end frame rod 28, the plates 14 and 30 being cut away to provide a space 51 to accommodate the eye 50. The upper side rod 10 is formed at its outer end with an upturned part 52 which is peened over and engages in an eye part 53 of the rod 31, which eye part is offset and is spaced somewhat inwardly of the box corner, that is, the rod 31 is bent around the corner and does not terminate in exact alignment with the box corner. Likewise, the outer end of the side frame rod 11 is upturned at 54 and is received in an eye 55 formed at the end of rod 32, the bottom eye 55 being in vertical alignment with the upper eye 53.

The rod 27 terminates at its end opposite to the eye 44 in an eye 56 adapted to receive the downturned end 57 of the rod 23, while the rod 31 has an eye 57 for receiving the pin part 58 of the rod 24, the rod 24 terminating in an eye 59 to receive the pin portion 60 of the rod 23. A stiffening plate 61 is welded to the inner side of the upper rod 24 and its corresponding lower rod (not shown). It will be readily recognized that all corresponding sections are made identical and thus certain parts of the side and end sections have been only partly illustrated. It will, of course, be understood that by the arrangement of the multiple eye and pin connections forming in effect hinges, all parts of the box may be pivoted to collapse the same or to set up the same.

The box is provided with pivoted closures 62 and 63, each adapted to cover one half of the box when the same are moved to closed position, said cover portions being made of light weight sheet metal, each provided with a plurality of perforations 64 for admitting of the passage of water or the like therethrough. As viewed in Fig. 1, the left hand end of the box and the end setcion 25 has secured thereto as by welding or the like a vertical rod 65 which may be welded to the wire fabric 29 and having an upper outstanding angular leg which terminates in an eye 66, the lower end 67 of which is bent outwardly at an angle and terminates in an eye 68. On the opposite side of the end piece 25 is also welded a vertical rod 69 which is preferably welded to the stiffening plate 30, said rod being bent at its upper end to form an outwardly extending leg portion 70 which terminates in an eye 71. The lower portion of the rod 69 is bent outwardly to form a slightly downwardly extending leg portion 72 which terminates in an eye 73.

As viewed in Fig. 1, the left hand top closure section 62 is provided at its outer end with a curled under portion 74, said curled portion receiving a pivot pin 75 which pin is driven through the eyes 66 and 71 and, of course, through the pin-receiving portion 74 of the cover plate, the cover at its left hand end being cut away as at 76 to provide a recess for the eye 66 and also being cut away as at 77 to receive the eye 71. It will, of course, be understood that the cover section 62 is in this manner pivoted upon the rod 75 and can be readily moved to open or closed position. The cover section 62 is provided adjacent its end with a latch member 78 which is pivoted as at 79 to the cover and has formed therein notches 80 to receive headed pins 81 which are rigidly secured to the cover section 63 and the pins 81 aligned with the openings 80 when the cover sections are moved to closed position.

The opposite end 26 of the box is likewise provided with a vertical rod 82 which may be fastened as by welding to the mesh fabric 33, the rod terminating at its upper end in an angular leg 83 which terminates in an eye 84, the rod 82 terminating at its lower end in an angularly bent leg 85 terminating in an eye 86. A rod similar to the rod 82 (but not shown) is welded to the opposite side of the box end 26, the same being of identical construction as the rod; and by referring to Fig. 6 it will be seen that the upper leg thereof terminates in an eye 87. A pintle pin 88 is driven through the curled portion 89 of the top closure 63, the pin also engaging within the eyes 87 and 84, whereby the cover portion 63 is pivoted to the box end. The box closure members are each provided with identical wooden handles 89 which are freely mounted on identical bales 90, each bale having oppositely disposed leg portions 91 which are received in strap members 92 which are welded to the respective top closure sections, whereby the handles are fastened to the respective top closure sections.

The box is provided with identical bottom sections 93 and 94 which sections are preferably constructed of light weight metal and are preferably perforated as seen in Fig. 3 at 95, whereby water or the like may pass through said perforations to the inside or outside of the box as desired.

The bottom section 93 terminates at its outer end in a curled portion 96 which curled portion is cut away at one of its ends 97 whereby to receive the eye 68, and is further cut away at 98 to receive the eye 73. A pintle pin 99 extends through the curled portion 96 and the respective eyes 68 and 73 whereby the bottom section 93 is pivotally mounted to the box frame. The bottom section 94 is curled around at its outer end as at 100 and is cut away at one end to receive the eye 86, and the pintle pin 101 is driven through the eye and the curled portion 100 to form a pivot for the bottom section 94. The bottom section 93 on its inner face and adjacent its inner edge portion is provided with a strap metal pin-receiving member 102 which may be preferably welded to the inside face of the bottom plate and is provided with a longitudinal slot 103 and two cross slots 104 and 105 which are adapted to receive the shaft part of a handle 106 which is rigidly mounted on a slidable bolt 107, the other bottom section 94 having welded thereto a bolt keeper 108, said bolt and arrangement providing a locking means for the two halves of the box bottom when the same are moved to closed position.

Referring to the respective closure sections 62 and 63, it will be seen that the same are pivoted as by the pintle pins, and when the sliding catch 78 is moved to disengage the pins 81 the tops can be pivoted completely around the pivot pin to the position indicated on the left hand side of Fig. 7, such pivotal movement giving free access to the interior of the box. The respective cover sections are provided along their side edges with openings 109 which openings are adapted to receive pins 110 which are respectively mounted on the frame rods 8 and 10, the pin and hole engagement being for the purpose of strengthening the box in its set up position.

The bottom sections are provided with openings along their edges to receive pins 111 when the box is in set up position ready for use. The bottom sections are, of course, pivoted around their respective pintles and are adapted, when moved to open position which is only possible after the slide bolt 107 has been disengaged, to assume the position shown more particularly in Fig. 7 where the respective bottom sections lie flush and in engagement with the two end sections 25 and 26 of the collapsible box.

It will readily be seen, and as heretofore stated, that the respective box sections are all pivotally connected together and, assuming that it is desirable to knock the box down, the first step is to release the catch 78 of the respective sections and fold each section to its outermost position whereupon access is had to the bolt lug 107 at the juncture of the respective bottom sections. After the bolt is unlocked the bottom sections are folded to lie against the respective end sections. Thereafter, the pivoted rod frame sections of the respective ends and sides are adapted to be folded, and, by referring specifically to Fig. 9, it will be seen that in folding the box the side 6 is first moved inwardly to engagement with the end section 25, such movement causing the side section 7 to move inwardly toward the side section 6. In further movement the side section bounded by the wire rod 23 is moved inwardly toward the side section 10, after which the side section bounded by the wire rod 24 is moved inwardly toward the section bounded by the wire rod 23, and thereafter the end section 26 is moved to a position adjacent the section bounded by the wire rod 24.

After such folding has been completed the respective bottom sections 93 and 94 are moved into engagement with the end sections 25 and 26, whereafter the two cover sections 62 and 63 are moved downwardly into contact with, or in somewhat spaced relation to, the two bottom sections 93 and 94, whereupon in its finally folded position the box handles 89 are adapted to be grasped and the collapsed box can be easily carried in its disassembled or folded condition.

The box is set up by means of unfolding the same in a directly inverse manner as that recited with respect to the folding of the box, or in other words by simply moving the two top sections to a horizontal plane and oppositely pulling thereon whereby the pivotal sections of the box will readily move to their extended or set up position, after which the two bottom sections are moved to close the bottom and are locked in place, and thereafter the top sections are moved to closed position and locked as by the catch 78.

It will thus be realized that I have provided a very efficient and novel live fish box which is constructed of sections, all of which are pivoted together without the required use of bolts or nuts and, for that matter, any loose parts which might possibly become lost during the assembling and disassembling of the live fish box. Further, the same is strong and sturdy and the respective sections thereof can readily be made with a very limited use of dies and the like, the box further being pivoted in such a manner that the pivotal connection between the respective sections is not affected by water, rusting or other particles such as sand, seaweed, or the like, to which the box would be subjected in use.

It is not intended that the invention be limited to the exact construction shown, as the same is capable of considerable variation within the scope of the following claims.

I claim:

1. A collapsible fish box or the like comprising opposite end members, pairs of side members pivoted in a plane intermediate the two end members, upper and lower wire rod frames defining each member, a wire mesh fabric welded to the frame members, vertical metal plates attached to the end members and side members and welded to the frame members, said rod frames having eyes and angular bent ends at opposite ends of the rods, the side members being pivoted to the opposite end members, the upper and lower frame rods of each end member having one eye at diametric opposite corners while the other eye is laterally spaced with respect to the opposite diametric corners, pairs of top and bottom closure plates pivoted respectively adjacent horizontal upper and lower frame rods, the bottom plates pivoting in open position in proximity to the opposite end members, the top closure plates pivoting in open position to overlie the bottom sections, the side members folding to internested position when the box is collapsed, handle members on the top sections adjacent the opposed ends thereof whereby the box can be carried in inverted collapsed condition, with its walls vertically disposed, and latch means detachably connecting said bottom plates whereby to prevent collapse of the box.

2. A collapsible fish box or the like, comprising end members and pairs of side members foldable intermediate the end members, each of the end members and each section of the side members having upper and lower horizontal framing rods, said rods forming pivotal means between the vertical edges of the end members and also between the intermediate portions of the pairs of side members, a wire mesh fabric welded to the frame rods, vertical stiffening rods having their ends welded between the top and bottom frame rods, each side member having a vertical metal stiffening plate positioned adjacent its ends and forming a portion of the corner of the box, a vertical metal stiffening plate mounted intermediate the pairs of the side members, vertical metal stiffening plates mounted on the end members in diametrically opposite sides and forming a portion of the corner of the box, pairs of perforated top and bottom box closure plates pivoted respectively to the horizontal upper and lower edges of the two end members, and the top closure plates being pivoted in outwardly offset relationship to the plane of said end members, handle elements carried adjacent the meeting edges of said top closure plates, and the latter and said handles providing gathering wings overlying the upwardly swung bottom plate sections for preventing outward movement of same when the collapsed box is being carried.

3. A collapsible fish box or the like, comprising end members and pairs of side members foldable intermediate the end members, each of the end members and each section of the side members having upper and lower horizontal framing rods, said rods forming pivotal means between the vertical edges of the end members and also between the intermediate portions of the pairs of side members, a wire mesh fabric welded to the frame rods, vertical stiffening rods having their ends welded between the top and bottom frame rods, each side member having a vertical metal stiffening plate positioned adjacent its ends and forming a portion of the corner of the box, a vertical metal stiffening plate mounted intermediate the pairs of the side members, vertical metal stiffening plates mounted on the end members in diametrically opposite sides and forming a portion of the corner of the box, pairs of perforated top and bottom box closure plates pivoted respectively to the horizontal upper and lower edges of the two end members, independent latch means for latching the top and bottom closure plates in box-closing position, and the top closure plates being pivoted in outwardly offset relationship to the plane of said end members, handle elements carried adjacent the meeting edges of said top closure plates, and the latter and said handles providing gathering wings overlying the upwardly swung bottom plate sections for preventing outward movement of same when the collapsed box is being carried.

4. A collapsible fish box or the like, comprising end members and pairs of side members foldable intermediate the end members, each of the end members and each section of the side members having upper and lower horizontal framing rods, said rods forming pivotal means between the vertical edges of the end members and also between the intermediate portions of the pairs of side members, a wire mesh fabric welded to the frame rods, vertical stiffening rods having their ends welded between the top and bottom frame rods, each side member having a vertical metal stiffening plate positioned adjacent its ends and forming a portion of the corner of the box, a vertical metal stiffening plate mounted intermediate the pairs of the side members, vertical metal stiffening plates mounted on the end members in diametrically opposite sides and forming a portion of the corner of the box, pairs of perforated top and bottom box closure plates pivoted respectively to the horizontal upper and lower edges of the two end members, independent latch means for latching the top and bottom closure plates in box-closing position, outwardly extending studs formed on the upper and lower side frame rods, the top and bottom plates having recesses into which the studs project when the said plates are moved to box-closing position, and the top closure plates being pivoted in outwardly offset relationship to the plane of said end members, handle elements carried adjacent the meeting edges of said top closure plates, and the latter and said handles providing gathering wings overlying the upwardly swung bottom plate sections for preventing outward movement of same when the collapsed box is being carried.

5. In a collapsible container having end walls and side walls and wherein each side wall comprises sections pivoted to said end walls and pivotally connected to one another intermediate said end walls in a manner to permit said end walls to be brought into close parallelism with one another with related side wall sections substantially folded upon each other; the combination of top and bottom walls each comprising a pair of outwardly swingable sections of a length approximating one-half the length of the container, hinge means connecting the outer ends of said sections to the proximate end wall adjacent the top and bottom thereof, respectively, said hinge means permitting said sections to be swung outwardly into substantial parallelism with the related end wall, separate releasable means connecting the opposed inner ends of said top and bottom wall-providing sections whereby to prevent outward swinging thereof and collapse of the container, cooperating carrying handle-providing members adjacent the inner ends of said top wall-providing sections at the exterior surfaces thereof whereby the container can be carried in its set up operative form, the end wall-carried hinge means for the top and bottom wall sections being parallel and each top wall hinge means being outwardly offset from the plane of the related bottom wall hinge means, whereby the top wall sections are swingable to confiningly overlie the previously swung bottom walls adjacent the related end wall, and the handle providing members cooperating in the hand of the user to retain the container collapsed and to enable it to be carried satchel-like with the bottom edges of the side and end walls disposed upwardly.

6. The combination set forth in claim 5, and the top and bottom hinge means for at least one end wall comprising upstanding laterally spaced wall-carried reinforcing rods having top and bottom outwardly projecting pivot-carrying ends.

7. The combination set forth in claim 5, and each of said cooperating handle-providing members comprising a swingable bail-like element movable to spacedly overlie the bottom of the collapsed container.

GLEN E. BOMBARGER.

References Cited in the file of this patent
UNITED STATES PATENTS

| Number | Name | Date |
| --- | --- | --- |
| 1,187,875 | Welty | June 20, 1916 |
| 1,358,562 | Kosteck | Nov. 9, 1920 |
| 1,620,585 | Walther | Mar. 8, 1927 |
| 1,698,678 | Garbs | Jan. 8, 1929 |
| 1,731,841 | Burson | Oct. 15, 1929 |
| 1,879,102 | Collins | Sept. 27, 1932 |
| 2,020,834 | Hatten | Nov. 12, 1935 |
| 2,216,277 | Massey | Oct. 1, 1940 |